United States Patent [19]

Nicholls

[11] Patent Number: 4,581,181
[45] Date of Patent: Apr. 8, 1986

[54] FLOATING PLATFORM AERATOR/MIXER APPARATUS

[75] Inventor: Ian H. Nicholls, New South Wales, Australia

[73] Assignee: General Signal Corporation, Stamford, Conn.

[21] Appl. No.: 655,441

[22] Filed: Sep. 28, 1984

Related U.S. Application Data

[63] Continuation of Ser. No. 465,240, Feb. 10, 1983, abandoned.

[30] Foreign Application Priority Data

Feb. 19, 1982 [AU] Australia .............................. PF2770

[51] Int. Cl.⁴ ............................................ B01D 47/16
[52] U.S. Cl. ..................................... 261/91; 261/120; 114/264; 405/200; 210/242.1
[58] Field of Search ............... 114/263, 264, 112, 265, 114/258; 405/196, 200, 210; 210/194, 242.1, 242.2; 261/91, 87, 120, 92

[56] References Cited

U.S. PATENT DOCUMENTS

| | | | |
|---|---|---|---|
| 2,963,868 | 12/1960 | Armstrong | 114/265 |
| 3,568,836 | 3/1971 | Ray | 210/242.1 |
| 3,595,537 | 7/1971 | Kaelin | 261/91 |
| 3,603,276 | 9/1971 | DeLisle | 114/263 |
| 3,802,673 | 4/1974 | Ross | 114/264 |
| 4,070,980 | 1/1978 | Shorter, Jr. | 114/263 |

Primary Examiner—S. D. Basinger
Assistant Examiner—Jesûs D. Sotelo
Attorney, Agent, or Firm—Barnes & Thornburg

[57] ABSTRACT

A floating platform structure mounted on ballast tanks disposed in a tank having the liquid to be mixed and/or aerated by an impeller carried by the platform. Guide members on the structure have longitudinally spaced sets of rollers slidably engaging upstanding posts in the tank and restrain the platform against rocking or horizontal movement due to wind or wave action, while allowing the platform to rise and fall with changes in the level of liquid in the tank.

6 Claims, 5 Drawing Figures

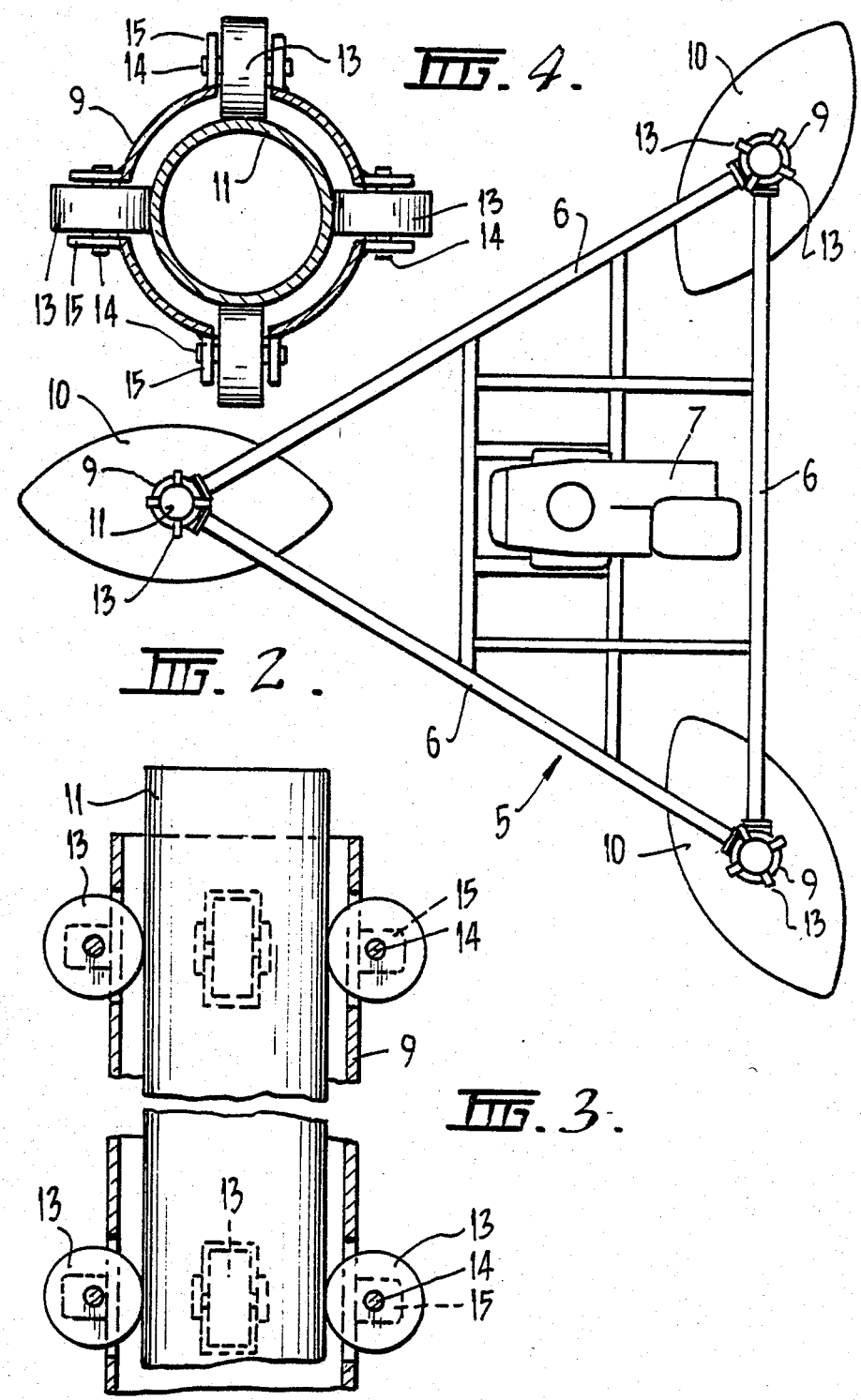

FLOATING PLATFORM AERATOR/MIXER APPARATUS

This is a continuation of application Ser. No. 465,240, filed Feb. 10, 1983, now abandoned.

BACKGROUND OF THE INVENTION

The present invention relates generally to aerator/mixer floating platform structures, and in particular relates to floating platforms guided for vertical movement on mooring posts.

It is known in treatment plants to utilise aerators and/or mixers mounted on floating platforms. Floating platforms are used to maintain a fixed distance between the aerator or mixer impeller center line and the liquid surface regardless of variations in the liquid depth.

Because of the nature of the treatment processes, any rocking or horizontal movement of the floating platform must be restricted to a minimum to allow suspended solids to settle when the aerator or mixer is on its off cycle and the treatment tanks are to be decanted.

Known systems currently in use for anchoring floating platforms in treatment plants are
 (a) a simple arrangement of ropes or cables,
 (b) rigid horizontal poles having ball joints at each end, and
 (c) vertical posts with a simple loop extending from the floating platform around each post.

It has been found that none of these existing systems will prevent the platform from rocking due to wind or wave action and they only constrain movement in the horizontal plane to varying degrees.

SUMMARY OF THE INVENTION

It is an object of the present invention to provide a floating platform mooring structure which will allow free vertical movement of the platform when the liquid level changes but will prevent rocking or horizontal movement.

Briefly described, and aerator/mixer embodying the invetion has a floating platform structure comprising a platform framework mounted on ballast tanks adapted to maintain the platform at a designated height above the level of liquid in a tank or the like. A plurality of tubular guide members are mounted on the platform framework, and may extend at right angles to frame members thereof. The guide members are slidably disposed on mooring posts. Each guide member is provided with a series of longitudinally spaced apart sets of rollers for resilient, rolling engagement with the mooring post on which it is disposed.

In order that the invention and its manner of performance may be more fully understood, reference is now made to embodiments of the invention as illustrated in the accompanying drawings.

BRIEF DESCRIPTION OF THE DRAWINGS

FIG. 2 is a plan view, from above, of the strucutre of FIG. 1;

FIG. 3 is a detailed, fragmentary sectional view taken along the line 3—3 of FIG. 1;

FIG. 4 is a detailed sectional view taken along the line 4—4 of FIG. 1; and

DESCRIPTION OF THE PREFERRED EMBODIMENTS

Figure 1:
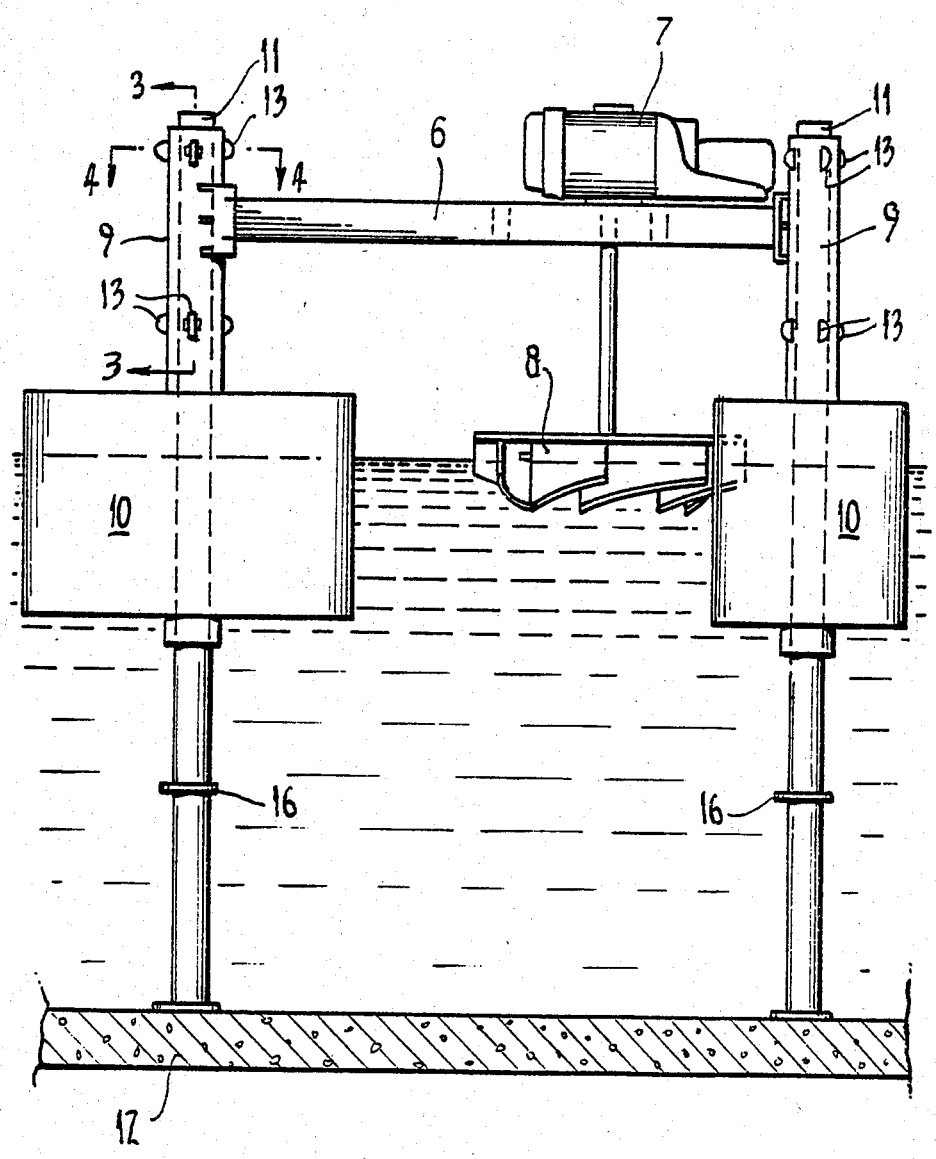
FIG. 1 is a side elevational view of one embodiment of the platform structure.

Referring to FIGS. 1 to 4 of the drawings, a platform structure generally designated at 5 comprises main frame members 6 forming a triangular structure on which is mounted drive means 7 for an impeller 8.

Connected to the corners of structure 5 are tubular guide members 9 of elongated form having ballast tanks 10 attached at their lower ends. Mooring posts or legs 11 are secured in symmetrical fashion to the bottom of treatment tank 12 and extend upwardly through ballast tanks 10 and tubular guide members 9.

Tubular guide members 9 are provided with longitudinal, spaced-apart sets of rollers 13; in this embodiment two sets of four rollers each. The rollers 13 are mounted on spindles 14 located in brackets 15 on guide members 9, and are preferably formed of resilient material or have a resilient outer periphery. The rollers 13 are adjustably mounted in slots (not shown) in brackets 15 to obtain the correct bearing load against mooring posts 11. Small irregularities in post verticalness and surface are accommodated by deflection of the resilient rollers. The posts 11 should be accurately positioned within guide members 9 to within the adjustment limits of rollers 13 before installing the rollers.

Ballast tanks are flooded, if necessary, to the required degree to position the impeller in relation to the liquid surface and stop members 16 are located on posts 11 to provide a downward limit of movement of the platform.

By utilising the balanced circumferentially spaced sets of rollers along the length of guide members 9, a restraining moment is produced if the platform tends to rock due to wind and/or wave action, and the suspended solids in the treatment plant are allowed to settle during the OFF cycle of the aerator.

Figure 5:
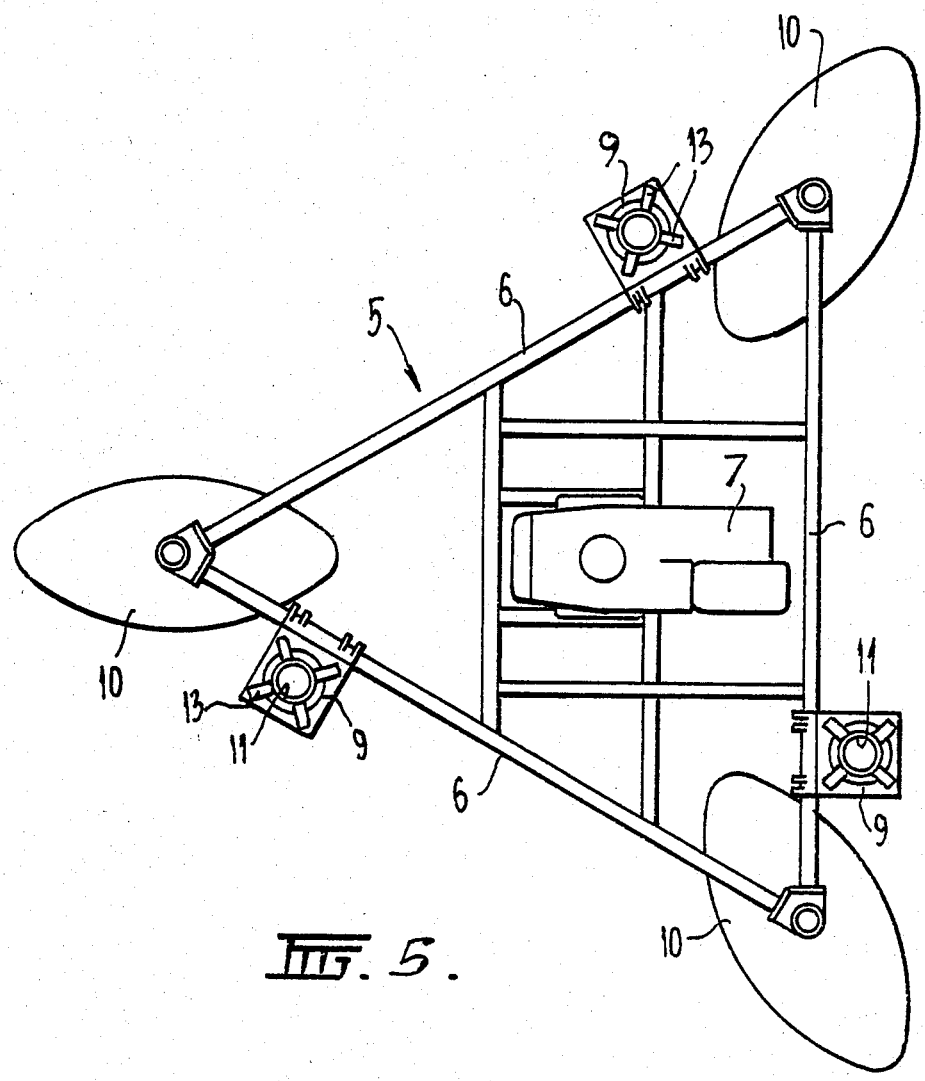
FIG. 5 is a plan view from above similar to FIG. 2 of another embodiment of the invention.

FIG. 5 illustrates an embodiment of the invention wherein the guide members 9 are located at positions inwardly of the corners of structure 5.

It will be appreciated that the invention is not limited to a triangular platform structure and more than two sets of rollers can be incorporated in each guide member, and the tubular guide members and mooring posts may be of other configuration than circular.

I claim:

1. Mixer apparatus for use with a tank containing a liquid comprising a floating platform structure for mounting an impeller, said structure having ballast tanks mounted on said structure for maintaining the platform at a designated height above the level of liquid in the tank, a plurality of vertical posts extending upwardly in said tank and fixed with respect to said floating platform, a plurality of guide members fixed in spaced relationship on said platform structure and in vertical slidable engagement with said posts, each of said guide members having spaced apart roller means which, in conjunction with said guide members, prevent non-vertical motion of said structure in response to liquid surface activity, and a plurality of slot means, one for each roller means, for providing radial adjustment of the roller means with respect to said guide members.

2. The apparatus according to claim 1 wherein each of said guide members is tubular, and having different ones of said posts disposed therein.

3. The apparatus according to claim 1 wherein said guide members are tubular, said posts being disposed within said tubular guide members, said roller means being disposed in sets, each having said roller means in diametrically opposed relationship.

4. The apparatus as set forth in claim 1 wherein said structure has a plurality of frame members in triangular configuration, and said guide members are mounted at the corners of said structure.

5. The apparatus according to claim 1 wherein said structure has a plurality of frame members in triangular configuration, and said guide members are mounted between and adjacent the corners of said structure in balanced configuration.

6. The apparatus, as set forth claim 1 wherein said ballast tanks are mounted on and around said guide members.

* * * * *